United States Patent [19]

De Schepper et al.

[11] Patent Number: 4,942,023

[45] Date of Patent: Jul. 17, 1990

[54] METAL EXTRACTION PROCESS WITH SUBSTITUTED 8-HYDROXYQUINOLINE

[75] Inventors: Achille J. De Schepper, Lichtaart; Guy G. Haesebroek, Mortsel; Antoine L. Van Peteghem, Olen, all of Belgium

[73] Assignee: Metallurgie Hoboken-Overpelt, Hoboken, Belgium

[21] Appl. No.: 287,143

[22] Filed: Dec. 21, 1988

[30] Foreign Application Priority Data

Jan. 18, 1988 [LU] Luxembourg ............................ 87108

[51] Int. Cl.$^5$ .............................................. C01G 1/00
[52] U.S. Cl. ........................................ 423/22; 423/84; 423/87; 423/89; 423/98; 423/112; 423/131; 20/681
[58] Field of Search ........................ 423/89, 98, 87, 22, 423/112, 131, 21.5, 24, 49, 54, 63, 70, 100, 139, 157, 181; 210/681

[56] References Cited

U.S. PATENT DOCUMENTS

| | | |
|---|---|---|
| 3,637,711 | 1/1972 | Budde Jr., et al. .......... 423/DIG. 14 |
| 3,883,634 | 5/1975 | DeSchepper et al. ................. 423/98 |
| 3,971,843 | 7/1976 | Helgorsky et al. .................. 423/181 |
| 4,102,976 | 7/1978 | Hiemeleers et al. .................... 423/87 |
| 4,169,130 | 9/1979 | Helgorsky et al. ................... 423/112 |
| 4,241,029 | 12/1980 | Helgorsky et al. ............ 75/101 B E |
| 4,389,379 | 6/1983 | Rouillardepouse Bauer et al. ........................................... 423/89 |
| 4,432,951 | 2/1984 | De Schepper et al. ............... 423/89 |
| 4,432,952 | 2/1984 | De Schepper et al. ............... 423/89 |
| 4,485,076 | 11/1984 | Bauer et al. .......................... 423/112 |
| 4,541,861 | 9/1985 | Demopoulous et al. .......... 75/0.5 A |
| 4,559,203 | 12/1985 | Bauer et al. .................... 75/101 B E |
| 4,568,526 | 2/1986 | Rouillard nee Bauer et al. ... 423/89 |
| 4,631,177 | 12/1986 | Yotsuyanagi et al. ............... 423/112 |
| 4,654,145 | 3/1987 | Demopoulos et al. ................ 423/24 |

FOREIGN PATENT DOCUMENTS

| | | | |
|---|---|---|---|
| 1061574 | 9/1979 | Canada ................................ 423/112 |
| 199905 | 10/1986 | European Pat. Off. ............ 423/112 |
| 1593289 | 7/1981 | United Kingdom ................ 423/112 |

OTHER PUBLICATIONS

"Extraction of Uranium by a Supported Liquid Membrane Containing Mobile Carrier" by K. Akiba et al. in Talanta, vol. 32, No. 8B, pp. 824–826, 1985.

"Solvent Extraction in Precious Metals Refining" by G. P. Demopoulos in Journal of Metals, Jun. 1986, pp. 13–17.

"A Novel Solvent Extraction System for the Refining of Precious Metals" by G. P. Demopoulos et al. in ISE.'86 International Solvent Extraction Conference-Munich Sep. 11–16, 1986, Preprints vol. II, pp. II--581–II-588.

"Liquid-Liquid Extraction of Germanium of Germanium with Oxine Derivatives" par G. Cute and D. Bauer in Hydrometallurgy 5(1980) 149–160.

J. Inorg. Nucl. Chem. vol. 41, pp. 1353–1363.

*Primary Examiner*—Robert L. Stoll
*Assistant Examiner*—Paige C. Harvey
*Attorney, Agent, or Firm*—Fred Philpitt

[57] ABSTRACT

A process using an extractant, that consists on the one hand of an active component being substituted 8-hydroxyquinoline and on the other hand of by-products of the manufacture of said extractant, said process being characterized in that the extractant contains at least 90 wt % of the active component.

10 Claims, No Drawings

METAL EXTRACTION PROCESS WITH SUBSTITUTED 8-HYDROXYQUINOLINE

The present invention relates to a process for separating a metal, that forms a complex with 8-hydroxyquinoline, from an aqueous solution containing said metal, comprising the steps of (a) contacting the aqueous solution with a liquid or solid organic phase containing an extractant, that consists on the one hand of an active component begin either a substituted 8-hydroxyquinoline or a mixture of substituted 8-hydroxyquinolines and on the other hand of by-products of the manufacture of said extractant, the contacting being carried out at such a pH that at least a part of said metal is transferred from the aqueous solution into the organic phase, whereby producing an aqueous solution depleted in said metal and an organic phase loaded with said metal;

(b) separating the aqueous solution depleted in said metal from the organic phase loaded with said metal;

(c) recovering said metal from the loaded organic phase; and (d) re-using in step (a) the organic phase that has been unloaded in step (c).

Such a process has already been described in the following references:

(1) US-A-3637711 filed 25.03.68
(2) US-A-3971843 with earliest priority of 12.07.74
(3) CA-A-1061574 with priority of 21.08.74
(4) US-A-4102976 with earliest priority of 1.04.75
(5) GB-A-1593289 with priority of 27.09.76
(6) US-A-4169130 with priority of 13.07.77
(7) "The recovery of gallium from Bayer process aluminate solutions by liquid-liquid extraction" by A. Leveque et al. in Proceedings of the International Solvent Extraction Conference ISEC 77, Toronto, 9–16 Sept. 1977, Volume 2, pp. 439–442
(8) US-A-4241029 with priority of 15.12.77
(9) "Liquid-liquid extraction of germnium with oxine derivatives" par G. Cote and D. Bauer in Hydrometallurgy, 5, 1980, pp. 149–160
(10) US-A-4389379 filed 15.08.80
(11) US-A-4432951 with priority of 22.06.81
(12) US-A-4568526 filed 4.01.82
(13) US-A-4485076 with priority of 26.08.82
(14) US-A-4559203 with priority of 26.08.82
(15) EP-A-143749 with priority of 29.11.83
(16) US-A-4654145 with priority of 7.06.84
(17) US-A-4541861 filed 13.09.84
(18) EP-A-199905 with priority of 7.03.85
(19) US-A-4631177 filed 2.07.85
(20) "Extraction of uranium by a supported liquid membrane containing mobile carrier" by K. Akiba et al. in Talanta, vol. 32, No. 8B, pp. 824–826, 1985
(21) "Solvent extraction in precious metals refining" G. P. Demopoulos in Journal of Metals, June 1986, pp. 13–17
(22) "A novel solvent extraction system for the refining of precious metals" by G. P. Demopoulos et al. in ISEC '86 International Solvent Extraction Conference - München, 11–16 Sept. 1986, Preprints Vol. II, pp. II-581-II-588

The following metals are separated from the aqueous solution:
antimony in reference (4)
cadmium in reference (1)
cobalt in references (3) and (17)
copper in references (1), (3) and (17)
gallium in references (2), (5) to (8), (13) to (16), (18) and (19) germanium in references (9) to (12) and (18)
gold in references (16), (21) and (22)
indium in reference (18)
molybdenium in reference (3)
nickel in reference (17)
palladium in references (16), (21) and (22)
platinum in references (16), (21) and (22)
uranium in reference (20)
zinc in references (1) and (3)

The extractant is contained in a liquid organic phase in references (10 to (18), (21) and (22). It is embedded in or supported by a solid organic phase in references (12), (19) and (20).

The metal is recovered from the loaded organic phase by contacting the latter with an aqueous stripping or eluting solution in references (1) to (16) and (18) to (22). In references (16) and (17) the metal is recovered from the loaded organic phase by treating the latter with a gaseous reducing agent.

The organic phase, which has been unloaded in step (c), is recycled towards step (a) either directly like for instance in reference (1), or after a previous conditioning like for instance in references (2) and (11). This previous conditioning consists for instance in a washing with water, when step (c) has been carried out with an acid solution (reference (2)), or in a washing with an acid solution, when step (c) has been carried out with an alkaline solution (reference (11)).

The product, commercialized under the registered trade name KELEX 100 by Sherex Chemical Company and Schering AG (previously by ashland Chemical Co), is used as an extractant in references (2) to (4), (7), (9) to (12) and (15) to (21). Before 1976 the active component of KELEX 100 was a beta-alkenyl substituted 8-hydroxyquinoline of the formula

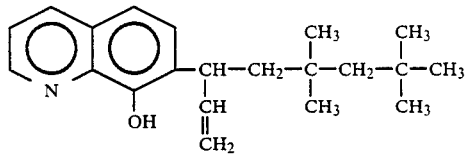

named 7-[5,5,7,7-tetramethyl-1-octenyl)]-8-hydroxyquinoline or 7-(1-vinyl-3,3,5,5-tetramethylhexyl)-8-hydroxyquinoline. At that time KELEX 100 consisted of approximately 77.7 (wt) % of the active component and 3.7% 8-hydroxyquinoline, the remainder being by-products of the manufacture of KELEX 100.

Since 1976 the active component of KELEX 100 is an alkyl substituted 8-hydroxyquinoline of the formula

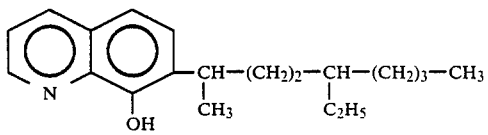

named 7-(4-ethyl-1-methyloctyl)-8-hydroxyquinoline. Post-1975 KELEX 100 consists of 82% of the active component and 0.5% 8-hydroxyquinoline, the balance being made up of various by-products of the manfacture (see "On the structure and composition of KELEX 100" by G. P. Demopoulos et al. in Hydrometallurgy, 11, 1983, pp. 389–396; see also reference (17), col. 4, 1.11–31).

A product containing a substituted 8-hydroxyquinoline with the same formula as the quinoline present in pre-1976 KELEX 100 is used as an extractant in reference (1). It should be assumed that this product is pre-1976 KELEX 100, since reference (1) is the basic patent on KELEX 100.

A product containing a substituted 8-hydroquinoline with the same composition as the quinoline present in post-1975 KELEX 100 is used as an extractant in references (5) and (6). The origin of this product is not mentioned.

References (8), (13) and (14) disclose a general formula covering among others the substituted 8-hydroxyquinoline present in pre-1976 KELEX 100 and that one present in post-1976 KELEX 100.

The product, commercialized under the registered trade name LIX 26 by Henkel Corporation, is used as an extractant in references (11), (16), (18), (21) and (22). There are only a few details available on the composition of LIX 26. According to G. P. Demopoulos et al., LIX 26 is a 7-substituted 8-hydroxyquinline consisting of a complex mixture of branched alkyl isomers with one or two unsaturation in the alkyl side chain, $C_{11}H_{22}$ and $C_{12}H_{24}$ being the most abundant alkylates of 8-hydroxyquinoline found in LIX 26 (see reference (22)). The active component of LIX 26 is thus a mixture of 8-hydroxyquinolines substituted by alkenyl groups in the 7 position. There is no reason to believe that LIX 26 would have higher percentage of active component than Kelex 100.

In all reference which use the Kelex 100 and/or LIX 26 reagent as an extractant in the metal separation process as defined herebefore, the reagent was used as received from the manufacturer, except in references (97) and (20) where the KELEX 100 was first washed with a HCL solution to eliminate the free 8-hydroxyquinoline.

The conclusion of the foregoing is that one has always used or suggested to use in the metal separation process as defined herebefore an extractant with a percentage of active component that is substantially lower than 90%.

The prior art processes described in references (1) to (22) present at least one of the following drawbacks:

the extractant degenerates rapidly, especially when its active component has an unsaturated side chain and when step (a) or (c) is carried out in an alkaline medium (see reference (5) and WO 82/01369); even if the active component has saturated side chain, degeneration remains substantial (see reference (6));

the metal transfer between the aqueous solution and the organic phase in step (a) and between the loaded organic phase and the aqueous stripping solution (if used) in step (c) occurs slowly, especially when the aqueous solution is an alkaline solution, unless either the contacting is carried out at a higher temperature like in reference (1), (2), (10), (11) and (12) or the organic phase contains special additives such as carboxylic acids, organosulfates and organophosphorus compounds like in references (8), (13), (14) and (15) to enhance the kinetics;

when a liquid organic phase is used in step (a), the separation of the aqueous solution depleted in metal from the organic phase loaded with metal, i.e., step (b), is difficult;

when separating Pt (IV) from a chloride solution with an organic phase containing KELEX 100 as an extractant, it's necessary to operate at a high temperature (65° C.) in order to avoid the precipitation of the relatively insoluble Kelex-Pt (IV) complex (see reference (22)).

The aim of the present invention is to provide a process such as defined herebefore, which avoids the drawbacks of the prior art processes.

Therefore, according to the invention an extractant is used that contains at leat 90 wt % of the active component.

It has been found, indeed, that when using such an extractant the degeneration rate of the extractant is substantially slowed down, the extraction and re-extraction kinetics are improved, the phase separation is easier and there is no precipitation problem with Pt (IV).

It should be noted here that in reference (10), column 5, lines 25–36, the following is reported:

"The rate of extraction depends on the extractant concentration and on the germanium concentration. To determine the total rate of extraction, tests have been run with the same concentrations of βoxH extractant on the one part and of Ge(IV) on the other part, but for different pH. The βoxH extractant concentration was 200 g/l, and that of Ge(IV) was 1.0 g/l. In a first run, the pH was very acidic, because the medium contained H2SO4 0.5 M, and in a second run, the pH was equal to 4. . In the first test (with commercial Kelex and 20 % of octanol), more than 50 % of germanium was extracted after 2 minutes only and, in the second run, a time of more than 20 minutes was necessary for extraction of 5 % of germanium (Kelex purified by distillation gives a slower reaction rate)". This passage calls for the following comments. It does not disclose the metal separation process to which the present invention relates; it discloses only a part thereof, to wit the extaction stage. The percentage of active component of "Kelex purified by distillation" is not given. Said "Kelex purified by distillation" was found to give a slower reaction rate, whereas the Applicant found that the reaction rate increases when using an extractant with a higher content of active component (as will be shown later). This could be explained by the fact that distillation of Kelex does not necessarily result in a purified product as it appears from "Commercial chelatin solvent extraction reagents. II. Purification and properties of beta-alkenyl-8-hydroxyquinoline" by A. W. Ashbrook in Journal of Chromatography, 105 (1975), p. 151–156 (see p. 154–5: "Kelex decomposes before it boils . . . The as-received material can be distilled under vacuum, but separation of components is not achieved by this method.") Anyhow, the above passage of reference (10) teaches away from the process of the present invention.

The extractant to be used in the process of the present invention has preferably a standard copper loading capacity of at least 0.9 g Cu/10 g extractant, which means that 1 liter of an organic phase, that was prepared from 50 g extractant, 250 ml isodecanol and kerosene as the balance, can be loaded with at least 4.5 g Cu, when contacted three times with 1 liter of a copper sulphate solution of 21.6 g/l $CuSo_4.5H_2O$, the pH of which has been previously adjusted to 4.

The active component of the extractant to be used in the process of the present invention may consist of at least one of the substituted 8-hydroxyquinlines, the formula of general formula of which has been disclosed in references (1) to (22) and WO 82/01369. The preferred hydroxyquinolines have the formula

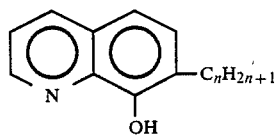

wherein n is comprised between 5 and 15. A typical representative thereof is the 7-(4-ethyl-1-methyloctyl)-8-hydroxyquinoline, i.e. the active component of post-1975 KELEX 100.

If a liquid organic phase is used in step (a), then the same diluents and modifiers and, possibly, the same reaction accelerating additives may be used as in references (1) to (18), (21) and (22) to form together with the extractant the liquid organic phase.

If a solid organic phase is used in step (a), the same methods may be uses as in references (12), (19) and (20) to have the extractant embedded in or supported by a porous solid organic material.

The contacting of the aqueous solution with the organic phase in step (a) may be carried out in the pH-conditions used in references (1) to (22).

The metal may be recovered from the loaded organic phase by the same methods as described in references (1) to (22).

Two or more metals may be separated simultaneously from an aqueous solution containing this metals, if step (a) is carried out at such a pH that at least a part of each of this metals is transferred from the aqueous solution into the organic phase. This metals may afterwards be recovered separately from the loaded organic phase, for instance by using in step (c) successively re-extraction solutions of a different pH.

The advantages of the process of the present invention are illustrated by the examples which are given further.

In these examples 4 types of extractant are used, which have the same a active component as post-1975 KELEX 100. The 4 extractants were supplied by Schering AG and they will be called hereafter: Extractant A, Extractant B, Extractant C and Extractant D.

Extractant A was found by gas-liquid chromatography to have 98.1 % active component. Its standard copper loading capacity, which is also a measure for its active component content, was found to be 1.04 g Cu/10 g Extractant.

The standard copper loading capacity is determined as follows:
(1) an organic phase is prepared that is composed of 50 g/1 Extractant, 25 vol. % isodecanol and the remainder Escaid 110 (kerosene)
(2) the organic phase is washed with diluted sulphuric acid of 200 g/1: the organic phase is shaken twice for 2 minutes with the sulphuric acid solution using an organic phase/aqueous phase (O/A) ratio of 1/1; after each step the emulsion is allowed to settle and the phases are separated
(3) the organic phase is washed twice with demineralized water using a shaking time of 2 minutes and an O/A ratio of 1/1; after each step the phases are separated; after the second step the organic phase is centrifugated in order to separate the last traces of aqueous phase
(4) the organic phase is then contacted three times with a copper sulphate solution of 21.6 g/1 CuSO4.5H2O, the pH of which has been previously adjusted to 4: the contacting is carried out by shaking for 2 minutes with an O/A ratio of 1/1; after each step the emulsion is allowed to settle and the phases are separated; after the third step the organic phase is centrifuged for 10 minutes
(5) 40 ml of the organic phase is shaken for 2 minutes with 40 ml of a sulphuric acid solution of 200 g/1 and then the mixture is centrifugated
(6) the copper concentration is determined in a sample of the aqueous phase
(7) the standard copper loading capacity of the organic phase, expressed as g Cu/10 g Extractant, is obtained by dividing the measured Cu concentration of the acid aqueous phase by 5 (the organic phase contains 50 g/1 Extractant).

Extractants B, C and D had, according to Schering AG, an active component content of respectively 92 %, 84 % and 77 %. Their standard copper loading capacity was found to be respectively 0.97, 0.87 and 0.79 g Cu/10 g Extractant.

EXAMPLE 1

In this example the degeneration rate of the various extractants in alkaline medium is tested.

The tests are carried out as follows. 1 liter of an organic phase (OF) containing the extractant to be tested is mixed for a given time with 1 liter of an alkaline aqueous solution, the organic phase having previously been alkalinized by contacting it for 2 minutes with an alkaline solution having the same composition as that one used in the test. Air is supplied above the mixture at a rate of 12 l/h and the temperature is kept at 50° C. The copper loading capacity of the organic phase is determined at the beginning and at the end of the test. Before determining its copper loading capacity, the organic phase is treated with a 200 g/1 $H_2SO_4$ solution to remove Na or K and then with water to remove $H_2SO_4$.

The following results are obtained with a 60 g/1 KOH solution:

| Test n° | OF composition in vol % | | Copper loading capacity in g Cu/l OF | | |
|---|---|---|---|---|---|
| | | | Initial | After 570 h of contact | Change (in %) |
| 1 | 18.5 | Extr. D | 14.5 | 12.8 | −11.7 |
| | 25 | Isodecanol | | | |
| | 56.5 | Escaid 110 | | | |
| 2 | 17.5 | Extr. C | 15.2 | 14.0 | −7.9 |
| | 25 | Isodecanol | | | |
| | 57.5 | Escaid 110 | | | |
| 3 | 17 | Extr. A | 17.7 | 17.8 | 0 |
| | 25 | Isodecanol | | | |
| | 58 | Escaid 110 | | | |

The following results are obtained with a 60 g/1 NaOH solution:

| Test n° | OF composition in vol % | | Copper loading capacity in g Cu/l OF | | |
|---|---|---|---|---|---|
| | | | Initial | After 1000 h of contact | Change (in %) |
| 4 | 9.9 | Extr. C | 8.61 | 6.69 | −22.3 |
| | 25 | Isodecanol | | | |
| | 61.5 | Escaid 110 | | | |
| 5 | 9.9 | Extr. B | 9.6 | 8.82 | −8.1 |
| | 25 | Isodecanol | | | |

-continued

| Test n° | OF composition in vol % | Copper loading capacity in g Cu/l OF | | |
|---|---|---|---|---|
| | | Initial | After 1000 h of contact | Change (in %) |
| | 65.1 Escaid 110 | | | |

The above results clearly show that the degeneration rate of the extractants is substantially reduced, when they have a higher percentage of active component.

EXAMPLE 2

In this example the kinetic behaviour of Extractants B, C and D is tested in gallium extraction.

In a first test 1 volume of an alkaline gallium solution, containing 9.9 g/l Ga and 57 Ga g/lNaOH, is contacted with 2 volumes of an organic phase made up of 15 vol % Extractant B, 15 vol % isodecanol and 70 vol % Escaid 120 (kerosene); the temperature is kept at 55° C. and the extraction yield (% of Ga transferred to the OF) is determined after 2, 5 and 15 minutes.

In a second and a third test, which are carried out in the same conditions as the first one, Extractant B is replaced respectively by Extractant C and D.

The following results are obtained:

| Test n° | Extractant | Extraction yield (in %) | | |
|---|---|---|---|---|
| | | 2' | 5' | 15' |
| 1 | B | 36.7 | 57.5 | 90.3 |
| 2 | C | 17.9 | 50.0 | 80.8 |
| 3 | D | 9.8 | 33.7 | 74.8 |

These results clearly indicate that the kinetics of the gallium extraction is substantially enhanced, when the extractant has a higher content of active component.

EXAMPLE 3

In this example the kinetic behavior of Extractants, A, B and D is tested in antimony extraction.

In a first test 1 volume of an acid antimony solution, containing 10.2 g/ 1 Sb, 80 g/l As and 109 g/l H2SO4, is contacted with 1.4 volume of an organic phase made up of 18 vol % Extractant a, 25 vol % isodecanol and 57 vol % Escaid 110, this organic phase having previously been acidified through contact with a 120 g/l H2SO4 solution; the temperature is kept at 35° C. and the extraction yield (% of Sb transferred to the OF) is determined after 1, 2 and 5 minutes.

In a second and third test, which are carried out in the same conditions as the first one, Extractant A is replaced respectively by Extractant B and D.

The following results are obtained:

| Test n° | Extractant | Extraction yield (in %) | | |
|---|---|---|---|---|
| | | 1' | 2' | 5' |
| 1 | A | 70.5 | 70.5 | 71.5 |
| 2 | B | 65.6 | 67.7 | 69.6 |
| 3 | D | 60.8 | 64.7 | 67.7 |

The results clearly indicate that the kinetics of the antimony extraction is substantially enhanced, when the extractant has a higher percentage of active component.

EXAMPLE 4

In this example the kinetic behaviour of Extractants, A, B and D is tested in germanium extraction.

In a first test 1 volume of an acid germanium solution, containing 0.74 g/ 1 Ge and 120 g/l H2SO4, is contacted with 0.5 volume of an organic phase made up of 10 vol% Extractant A, 25 vol % isodecanol and 65 vol % Escaid 110, this organic phase having previously been acidified through contact with a 120 g/l HSO4 solution; the temperature is kept at 35° C. and the extraction yield (% of Ge transferred to the OF) is determined after 1, 2 and 5 minutes.

In a second and third test, which are carried out in the same conditions as the first one, Extractant A is replaced respectively by Extractant B and D.

The following results are obtained:

| Test n° | Extractant | Extraction yield (in %) | | |
|---|---|---|---|---|
| | | 1' | 2' | 5' |
| 1 | A | 95.9 | 98.5 | 99.7 |
| 2 | B | 95.2 | 98.4 | 99.6 |
| 3 | D | 92.1 | 96.7 | 99 |

These results show that the kinetics of the germanium extraction is enhanced, when the extractant has a higher percentage of active component.

EXAMPLE 5

In this example the settling behaviour of organic phases containing the Extractants B, C and D is tested.

In a first test 1 volume of an alkaline gallium solution, containing 9.9 g/l Ga and 57 g/l NaOH, is mixed for 30 minutes with 2 volumes of an organic phase made up of 15 vol % Extractant B, 15 vol % isodecanol and 70 % Escaid 120, while the temperature is kept at 55° C., and then the settling time is determined as well as the Ga-concentration of the settled organic phase.

In a second and a third test, which are carried out in the same conditions as the first one, Extractant B is replaced respectively by Extractant C and D.

The following results are obtained:

| Test n° | Extractant | Settling time | [Ga]OF in g/l |
|---|---|---|---|
| 1 | B | 1'58" | 4.898 |
| 2 | C | 2'36" | 4.597 |
| 3 | D | 4'34" | 4.520 |

These results clearly show that the settling time is substantially reduced, when the extractant has a higher percentage of active components.

EXAMPLE 6

This example realtes to the extraction of platinum and palladium with Extractant B and Extractant D.

In a first test 1 volume of a 3N HCl solution having 51.6 g/l Pd and 12.1 g/l Pt is mixed at 20° C. for 10 minutes with 5 volumes of an organic phase composed pf 20 vol % Extractant B, 25 vol % isodecanol and 55 vol % Escaid 120, this organic phase having previously been acidified through contact with 3N HCl. Then the phases are allowed to settle. Complete settling is achieved after 13 minutes; the phases are free of any precipitate. The aqueous phase is found to have 3.935 Pd and 0.116 g/l Pt, and the organic phase 9.590 g/l Pd and 2.420 g/l Pt. The distribution coefficient for Pd is thus 2.437 and for Pt 20.86. Pt can be stripped from the organic phase by water, and Pd by 6 to 8N HCL.

In a second test 1 volume of an acid solution having the same composition as that one used in the first test is mixed at 20° C. with 5 volumes of an organic phase composed of 20 vol % Extractant D, 25 % vol isodecanol and 55 vol % Escaid 120, previously acidified. Very soon a brownish precipitate is formed in the mixture, which means that the organic phase is not suited for the simultaneous extraction of Pd and Pt from HCl solutions. Analysis of the wet precipitate shows that it contains about 10 % Pt and 0.5 % Pd.

The process of the present invention is very useful, when the metal has to be separated from an alkaline solution, more particularly from a solution the pH of which is above 13; it is thus particularly attractive for extracting the gallium contained in the sodium aluminate solutions from the Bayer process. The process of the invention is also very useful, when the metal has to be recovered in step (c) from the organic phase by means of an alkaline solution, more particularly by means of a solution the pH of which is above 13, which is the case with germanium and antimony. It is very useful too for recovering valuable metals such as indium. It is, moreover, very useful for separating precious metals, more particularly platinum, because it allows operating at the ambient temperature with an extractant, the active component of which has a saturated side chain; such an extractant degenerates less rapidly than an extractant, the active component of which has an unsaturated side chain.

It is clear that by the expression "an extractant, that consists on the one hand of an active component being either a substituted 8-hydroxyquinoline or a mixture of substituted 8-hydroxyquinolines and on the other hand of by-products of the manufacture of said extractant", used hereinbefore and in the claims, is meant a reagent that has not yet been diluted after it has been synthesized (e.g. by reacting 8-hydroxyquinoline with a substituting agent) and up-graded, since diluent added after the up-grading stage are not by-products of the manufacture of the reagent.

We claim:

1. In a process for separating a metal, that forms a complex with a substituted 8-hydroxyquinoline, from an aqueous solution containing said metal, comprising the steps of
  (a) preparing a liquid or solid organic phase containing a substituted 8-hydroxyquinoline extractant,
  (b) contacting the aqueous solution with the organic phase at such a pH that at least part of said metal is transferred from the aqueou solution into the organic phase, whereby producing an aqueous solution depleted in said metal and an organic phase loaded with said metal,
  (c) separating the aqueous solution depleted in said metal from the organic phase loaded with said metal,
  (d) recovering said metal from the loaded organic phase, and
  (e) reusing in step (b) the organic phase that has been unloaded in step (d),
the improvement which comprises minimizing the degeneration rate of the extractant by using in step (a) a substituted 8-hydroxyquinoline extractant that has, in the undiluted state, a substituted 8-hydroxyquinoline content of at least 90 wt%.

2. A process according to claim 1 wherein the substituted 8-hydroxyquinoline extractant has standard copper loading capacity of at least 0.9 g Cu/10 g extractant.

3. A process according to claim 1 wherein the substituted 8-hydroxyquinoline extractant contains at least one substituted 8-hydroxy-quinoline of the formula

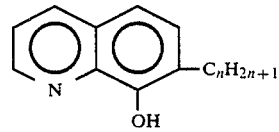

wherein n is between 5 and 15.

4. A process according to claim 1 wherein step (b) is carried out in an alkaline medium.

5. A process according to claim 4 wherein step (b) is carried out at a pH above 13.

6. A process according to claim 1 wherein step (d) is carried out in an alkaline medium.

7. A process according to claim 6 wherein step (d) is carried out at a pH above 13.

8. A process according to claim 4 wherein the metal is gallium.

9. A process according to claim 6 wherein the metal is germanium or antimony.

10. A process according to claim 1 wherein the metal is indium or platinum.

UNITED STATES PATENT AND TRADEMARK OFFICE
CERTIFICATE OF CORRECTION

PATENT NO. : 4,942,023

DATED : July 17, 1990

INVENTOR(S) : ACHILLE J. DE SCHEPPER et al

It is certified that error appears in the above-identified patent and that said Letters Patent is hereby corrected as shown below:

Col. 1, line 11, "begin" should read --- being ---.
Col. 2, line 3, after "19" a new line should start with --- germanium ---.
Col. 2, line 13, "10" should read --- 1 ---.
Col. 2, line 33, "ashland" should read --- Ashland ---.
Col. 2, line 47, "7-[5,5,7,7-tetramethyl-1-octenyl)]-8-hydroxyquinoline" should read --- 7-[3-(5,5,7,7-tetramethyl-1-octenyl)]-8-hydroxyquinoline ---.
Col. 3, line 23, "8-hydroxyquinline" should read --- 8-hydroxyquinoline ---.
Col. 3, line 25, "unsaturation" should read --- unsaturations ---.
Col. 3, line 33 & 60, "reference" should read --- references ---.
Col. 3, line 37, "(97)" should read --- (7) ---.
Col. 4, line 29, "4." should read --- 4 ---.
Col. 4, line 32-33, "5 %" should read --- 50 % ---.
Col. 4, line 37 "extaction" should read --- extraction ---.
Col. 4, line 46, "chelatin" should read --- chelating ---.
Col. 4, line 52, after ")" a period should be inserted.
Col. 4, line 67, "Formula of" should read --- formula or ---.(1st Occur)
Col. 5, line 20, "uses" should read --- used ---.
Col. 5, line 41, "a" should be deleted.
Col. 7, line 20, "C." should read --- C ---.

UNITED STATES PATENT AND TRADEMARK OFFICE
CERTIFICATE OF CORRECTION

PATENT NO. : 4,942,023

DATED : July 17, 1990

INVENTOR(S) : Achille J. De Schepper et al

It is certified that error appears in the above-identified patent and that said Letters Patent is hereby corrected as shown below:

Col. 7, line 44, "Extractant a" should read --- Extractant A ---.
Col. 7, line 67, after "Extractant" delete the comma--,--.
Col. 8, line 32, "70%" should read --- 70 vol % ---.
Col. 8, line 57, "pf" should read --- of ---.
Col. 8, line 62-63, "3.935 Pd" should read --- 3.935 g/l Pd ---.
Col. 9, line 36, "diluent" should read --- diluents ---.
Col. 10, line 1, "aqueou" should read --- aqueous ---.

Signed and Sealed this

Eighth Day of October, 1991

*Attest:*

HARRY F. MANBECK, JR.

*Attesting Officer*     *Commissioner of Patents and Trademarks*